(12) United States Patent
Tashiro et al.

(10) Patent No.: US 7,872,958 B2
(45) Date of Patent: Jan. 18, 2011

(54) OPTICAL INFORMATION RECORDING/REPRODUCING DEVICE, OPTICAL ELEMENT FOR THE SAME, AND DESIGN METHOD OF THE SAME

(75) Inventors: Yoshiyuki Tashiro, Saitama (JP); Daisuke Koreeda, Saitama (JP); Koichi Maruyama, Tokyo (JP)

(73) Assignee: Hoya Corporation, Tokyo (JP)

( * ) Notice: Subject to any disclaimer, the term of this patent is extended or adjusted under 35 U.S.C. 154(b) by 600 days.

(21) Appl. No.: 11/752,386

(22) Filed: May 23, 2007

(65) Prior Publication Data

US 2007/0274190 A1    Nov. 29, 2007

(30) Foreign Application Priority Data

May 25, 2006    (JP) .............................. 2006-145220

(51) Int. Cl.
*G11B 7/135*    (2006.01)
(52) U.S. Cl. ................................. 369/112.23
(58) Field of Classification Search ........................ None
See application file for complete search history.

(56) References Cited

U.S. PATENT DOCUMENTS

| | | | |
|---|---|---|---|
| 6,791,764 B2 * | 9/2004 | Hosoe | ......................... 359/719 |
| 2003/0185134 A1 * | 10/2003 | Kimura et al. | ......... 369/112.08 |
| 2005/0281173 A1 | 12/2005 | Koreeda et al. | |
| 2006/0181978 A1 | 8/2006 | Koreeda et al. | |
| 2006/0203692 A1 * | 9/2006 | Ota et al. | ................ 369/112.23 |
| 2006/0280061 A1 | 12/2006 | Koreeda et al. | |

FOREIGN PATENT DOCUMENTS

| | | |
|---|---|---|
| JP | 2001 195769 | 7/2001 |
| JP | 2005 203043 | 7/2005 |

OTHER PUBLICATIONS

English language Abstract of JP 2001-195769, Jul. 19, 2001.
English language Abstract of JP 2005-203043, Jul. 28, 2005.
Komma et al, "Compatible Objective Lens for Blu-ray Disc and DVD using Diffractive Optical Element and Phase-step Element which Corrects both Chromatic and Spherical Aberration", ISOM 2003 Proceedings, Matsushita Electric Co., Ltd.
U.S. Appl. No. 11/762,096 to Koizumi et al., which was filed Jun. 13, 2007.

\* cited by examiner

*Primary Examiner*—Peter Vincent Agustin
*Assistant Examiner*—Emily Frank
(74) *Attorney, Agent, or Firm*—Greenblum & Bernstein P.L.C.

(57) ABSTRACT

In an optical information recording/reproducing device which executes information reading or writing on multiple types of optical discs having different data densities by selectively using first through third light beams having first through third wavelengths, respectively, at least one side of an optical element is provided with a step structure including a plurality of concentric refracting surfaces and steps between them. The steps include first steps each giving a first optical path length difference specified by a first optical path difference function, second steps each giving a second optical path length difference specified by a second optical path difference function, and special steps each giving an optical path length difference obtained by the sum or difference of/between the first and second optical path length differences. Annular zone widths between adjacent steps are set at 10 times the first wavelength or more.

13 Claims, 5 Drawing Sheets

OPTICAL INFORMATION RECORDING/REPRODUCING DEVICE, OPTICAL ELEMENT FOR THE SAME, AND DESIGN METHOD OF THE SAME

BACKGROUND OF THE INVENTION

The present invention relates to an optical information recording/reproducing device for reading information from and/or writing information to multiple types of optical discs (differing in data density, protective layer thickness, etc.), an optical element installed in the optical information recording/reproducing device, and a design method of the optical element.

There exist various standards of optical discs (CD, DVD, etc.) differing in data density, protective layer thickness, etc. Meanwhile, new-standard optical discs (HD DVD (High-Definition DVD), BD (Blu-ray Disc), etc.), having still higher data density than DVD, are being brought into practical use in recent years to realize still higher information storage capacity. The protective layer thickness of such a new-standard optical disc is substantially equal to or less than that of DVD. In consideration of user convenience with such optical discs according to multiple standards, the optical information recording/reproducing devices (more specifically, objective optical systems installed in the devices) of recent years are required to have compatibility with at least two (preferably, three) of the above optical disc standards. Incidentally, in this specification, the "optical information recording/reproducing devices" include devices for both information reading and information writing, devices exclusively for information reading, and devices exclusively for information writing. The above "compatibility" means that the optical information recording/reproducing device ensures the information reading and/or information writing with no need of component replacement even when the optical disc being used is switched.

In order to provide an optical information recording/reproducing device with the compatibility with optical discs of multiple standards, the device is generally configured to be capable of forming a beam spot suitable for the particular data density of the new disc (in the switching of the optical disc to the new disc of a different standard) by changing the NA (Numerical Aperture) of the objective lens employed for the information read/write, while also correcting spherical aberration which varies depending on the protective layer thickness. Since the diameter of the beam spot generally gets smaller as the wavelength of the beam gets shorter, multiple laser beams having different wavelengths are selectively used by the optical information recording/reproducing device depending on the data density of the disc. For example, for DVDs, a laser beam with a wavelength of approximately 660 nm (shorter than approximately 790 nm for CDs) is used. For the aforementioned new-standard optical discs, a laser beam with a wavelength still shorter than that for DVDs (e.g. so-called "blue laser" around 408 nm) is used in order to deal with the extra-high data density.

Meanwhile, in order to finely converge each light beam (being used) exactly at the read/write position on the record surface of the corresponding optical disc, a well-known method employs an "annular zone structure" (including a plurality of concentric annular zones with a minute step between adjacent zones) on one or more arbitrary-selected surfaces of at least one optical element (e.g. objective lens) of the objective optical system. By the effect of the annular zone structure, light beams of different wavelengths can be finely converged on the record surfaces of the corresponding optical discs, respectively.

Optical pickup devices having the aforementioned compatibility with two types of optical discs having different data densities have been proposed in Japanese Patent Provisional Publication No. 2005-203043 (hereinafter referred to as JP 2005-203043A) and Yoshiaki Komma et al. "Compatible objective lens for blu-ray disc and DVD using diffractive optical element and phase-step element which corrects both chromatic and spherical aberration (ISOM 2003 proceedings (We-F-20), Matsushita Electric Co., Ltd. (hereinafter referred to as a "document #1"), for example.

Meanwhile, an optical pickup device having the compatibility with three types of optical discs having different data densities has been proposed in Japanese Patent Provisional Publication No. 2001-195769 (hereinafter referred to as JP 2001-195769A), for example.

The optical pickup device disclosed in the JP 2005-203043A corrects relative spherical aberration which is caused by the difference between the protective layer thicknesses of the two types of optical discs, by employing an optical element having the annular zone structure (including a plurality of concentric annular zones with a minute step between adjacent zones) on one surface.

Meanwhile, in the document #1, two lens surfaces in the objective optical system are provided with different diffracting structures having different effects, by which each of the laser beams corresponding to DVD and BD can be finely converged on the record surface of the corresponding optical disc (DVD, BD) while also correcting a change in the spherical aberration caused by wavelength variation.

In JP 2001-195769A, a diffracting structure is formed on both surfaces of the objective lens, by which each of the laser beams corresponding to HD DVD, DVD and CD can be finely converged on the record surface of the corresponding optical disc (HD DVD, DVD, CD).

However, forming the diffracting structure on two lens surfaces as above tends to result in performance degradation deriving from manufacturing errors (decentering, etc.). Further, when the objective lens optical system is composed of a single lens as in the optical pickup device of JP 2001-195769A for reducing the number of components and the cost, the diffracting structure on one lens surface is exposed to the outside via the disc tray and the exposed diffracting structure has a high possibility of being destroyed when a lens cleaner is used, for example.

SUMMARY OF THE INVENTION

The present invention is advantageous in that an optical element for an optical information recording/reproducing device, achieving high performance and the compatibility with multiple types of optical discs of different standards while being manufactured with ease, can be provided together with an optical information recording/reproducing device equipped with the optical element and a design method of the optical element.

In accordance with an aspect of the present invention, there is provided an optical element for an optical information recording/reproducing device which executes information reading and/or writing on multiple types of optical discs having different data densities by selectively using first through third light beams having first through third wavelengths $\lambda_1$-$\lambda_3$ ($\lambda_1 < \lambda_2 < \lambda_3$) respectively. At least one side of the optical element is provided with a step structure including a plurality of concentric refracting surfaces and a plurality of steps formed between adjacent ones of the plurality of concentric refracting surfaces. The steps include first steps each giving a first optical path length difference specified by a first optical path difference function, second steps each giving a second optical path length difference specified by a second optical path difference function different from the first optical path difference function, and special steps each giving an optical path length difference obtained by one of a sum the first and second optical path length differences and a difference between the first and second optical path length differences. Each of annular zone widths between adjacent ones of the plurality of steps is set at 10 times the first wavelength or more.

With the optical element for an optical information recording/reproducing device configured as above, narrow annular zones are removed effectively from the step structure (which is formed on at least one side of the optical element) and an optical element capable of maintaining high performance while being manufactured with ease can be realized. Incidentally, the "narrow annular zone" in this specification means an annular zone whose width (annular zone width) is less than 10 times the wavelength of a prescribed light beam. The "annular zone width" means the distance between two adjacent steps measured in a direction orthogonal to the optical axis of the optical element, that is, the difference between distances of the two steps from the optical axis.

In at least one aspect, the special step gives the first light beam an optical path length difference having an absolute value substantially equal to |L2|-|L1| when a first optical path length difference L1 specified by the first optical path difference function for the first light beam and a second optical path length difference L2 specified by the second optical path difference function for the first light beam (assuming that |L1|<|L2|) satisfy L1×L2<0, and the special step gives the first light beam an optical path length difference having an absolute value substantially equal to |L2|+|L1| when the first and second optical path length differences L1 and L2 satisfy L1×L2>0.

The optical element configured as above can be suitably employed as an objective lens used for the optical information recording/reproducing device.

In at least one aspect, a protective layer thickness t1 of a first optical disc on which the information read/write is executed using the first light beam, a protective layer thickness t2 of a second optical disc on which the information read/write is executed using the second light beam, and a protective layer thickness t3 of a third optical disc on which the information read/write is executed using the third light beam satisfy t1≦t2<t3. A numerical aperture NA1 of the optical element required for the information read/write on the first optical disc, a numerical aperture NA2 of the optical element required for the information read/write on the second optical disc, and a numerical aperture NA3 of the optical element required for the information read/write on the third optical disc satisfy NA1>NA3 and NA2>NA3. The step structure includes: a first area which is formed to include an optical axis of the optical element to converge the third light beam on a record surface of the third optical disc; and a second area which is formed outside the first area to converge the first and second light beams on record surfaces of the first and second optical discs, respectively, without contributing to the convergence of the third light beam.

In at least one aspect, a focal length f1 in the information read/write on the first optical disc, a focal length f2 in the information read/write on the second optical disc and the numerical apertures NA1 and NA2 satisfy f1×NA1>f2×NA2, and the step structure further includes a third area which is formed outside the second area to exclusively converge the first light beam on the record surface of the first optical disc without contributing to the convergence of the second light beam.

In at least one aspect, a focal length f1 in the information read/write on the first optical disc, a focal length f2 in the information read/write on the second optical disc and the numerical apertures NA1 and NA2 satisfy f1×NA1<f2×NA2, and the step structure further includes a third area which is formed outside the second area to exclusively converge the second light beam on the record surface of the second optical disc without contributing to the convergence of the first light beam.

In accordance with another aspect of the present invention, there is provided an optical information recording/reproducing device which executes information reading or writing on multiple types of optical discs having different data densities by selectively using first through third light beams having first through third wavelengths λ1-λ3 (λ1<λ2<λ3) respectively. A protective layer thickness t1 of a first optical disc on which the information read/write is executed using the first light beam, a protective layer thickness t2 of a second optical disc on which the information read/write is executed using the second light beam, and a protective layer thickness t3 of a third optical disc on which the information read/write is executed using the third light beam satisfy t1≦t2<t3. A numerical aperture NA1 of the optical element required for the information read/write on the first optical disc, a numerical aperture NA2 of the optical element required for the information read/write on the second optical disc, and a numerical aperture NA3 of the optical element required for the information read/write on the third optical disc satisfy NA1>NA3 and NA2>NA3. At least one side of an optical element of an objective optical system of the optical information recording/reproducing device is provided with a step structure including a plurality of concentric refracting surfaces and a plurality of steps formed between adjacent ones of the plurality of concentric refracting surfaces. The steps include first steps each giving a first optical path length difference specified by a first optical path difference function, second steps each giving a second optical path length difference specified by a second optical path difference function different from the first optical path difference function, and special steps each giving an optical path length difference obtained by the sum or difference of/between the first and second optical path length differences. Each of annular zone widths between adjacent ones of the plurality of steps is set at 10 times the first wavelength or more.

In at least one aspect, the step structure includes: a first area which is formed to include an optical axis of the optical element to converge the third light beam on a record surface of the third optical disc; and a second area which is formed outside the first area to converge the first and second light beams on record surfaces of the first and second optical discs, respectively, without contributing to convergence of the third light beam.

In at least one aspect, a focal length f1 in the information read/write on the first optical disc and a focal length f2 in the information read/write on the second optical disc and the numerical apertures NA1 and NA2 satisfy f1×N1>f2×NA2 , and the step structure further includes a third area which is formed outside the second area to exclusively converge the first light beam on the record surface of the first optical disc without contributing to the convergence of the second light beam.

In at least one aspect, a focal length f1 in the information read/write on the first optical disc and a focal length f2 in the information read/write on the second optical disc and the numerical apertures NA1 and NA2 satisfy f1×NA1<f2×NA2, and the step structure further includes a third area which is formed outside the second area to exclusively converge the second light beam on the record surface of the second optical disc without contributing to the convergence of the first light beam.

In at least one aspect, all of the first through third light beams incident upon the optical element having the step structure are substantially collimated beams. With this configuration, off-axis aberration occurring during tracking shifts can be suppressed effectively.

In accordance with another aspect of the present invention, there is provided a design method of an optical element for an optical information recording/reproducing device which executes information reading and/or writing on multiple types of optical discs having different data densities by selectively using first through third light beams having first through third wavelengths $\lambda1$-$\lambda3$ ($\lambda1<\lambda2<\lambda3$) respectively. In the design method, at least one side of the optical element is provided with a step structure including a plurality of concentric refracting surfaces and a plurality of steps formed between adjacent ones of the plurality of concentric refracting surfaces. A design process of the step structure includes the steps of: defining the step structure by use of at least two types of optical path difference functions; and setting at least one special step by reducing position difference between at least one pair of adjacent steps, which are included in a plurality of steps figured out based on the at east two types of optical path difference functions and whose position difference is less than 10 times the first wavelength, to substantially 0 by controlling at least one of the positions of the adjacent steps forming the pair.

In at least one aspect, the design process of the step structure is applied to at least one pair of adjacent steps that give optical path length differences having different signs. With this configuration, extremely large special steps can be prevented and light utilization efficiency can be maintained at a high level.

As described above, in the present invention, special steps are formed in the step structure (formed on at least one side of the optical element) by properly controlling the positions of the two types of steps (first steps, second steps), by which an optical element free from the so-called "narrow annular zones" can be obtained. With such an optical element with no narrow annular zones, high optical performance can be maintained while also preventing a decrease in the amount of transmitted light.

The optical information recording/reproducing device in accordance with the present invention, employing the optical element described above, is capable of performing high-accuracy information read/write on all of the three types of optical discs having different data densities.

DETAILED DESCRIPTION OF THE EMBODIMENTS

Hereinafter, an embodiment according to the invention is described with reference to the accompanying drawings.

In the following, an objective lens as an optical element in accordance with an embodiment of the present invention will be described. The objective lens of this embodiment, which is installed in an optical information recording/reproducing device, has the compatibility with three types of optical discs according to different specifications (protective layer thickness, data density, etc.).

In the following explanation, an optical disc of a type (one of the three types) having the highest data density (e.g. new-standard optical disc such as HD DVD, DVD or BD) will be referred to as a "first optical disc D1", an optical disc of a type having a relatively low data density compared to the first optical disc D1 (DVD, DVD-R, etc.) will be referred to as a "second optical disc D2", and an optical disc of a type having the lowest data density (CD, CD-R, etc.) will be referred to as a "third optical disc D3" for convenience of explanation.

The protective layer thicknesses t1-t3 of the first through third optical discs D1-D3 satisfy the following relationship:

$$t1 \leq t2 < t3$$

In order to carry out the information read/write on each of the optical discs D1-D3, the NA (Numerical Aperture) required for the information read/write has to be varied properly so that a beam spot suitable for the particular data density of each disc can be formed. The optimum design NAs required for the information read/write on the three types of optical discs D1, D2 and D3 (hereinafter described as "NA1", "NA2" and "NA3") satisfy the following relationships:

$$(NA1>NA3) \text{ and } (NA2>NA3)$$

Specifically, for the information read/write on the first or second optical disc D1, D2 (having high data density), a relatively large NA is required since a relatively small spot has to be formed. On the other hand, for the information read/write on the third optical disc D3 (having the lowest data density), the required NA is relatively small. Incidentally, each optical disc is set on a turntable (not shown) and rotated at high speed when the information read/write is carried out.

In cases where three types of optical discs D1-D3 (having different data densities) are used as above, multiple laser beams having different wavelengths are selectively used by the optical information recording/reproducing device so that a beam spot suitable for each data density can be formed on the record surface. Specifically, for the information read/write on the first optical disc D1, a "first laser beam" having the shortest wavelength (first wavelength) is emitted from a light source so as to form the smallest beam spot on the record surface of the first optical disc D1. On the other hand, for the information read/write on the third optical disc D3, a "third laser beam" having the longest wavelength (third wavelength) is emitted from a light source so as to form the largest beam spot on the record surface of the third optical disc D3. For the information read/write on the second optical disc D2, a "second laser beam" having a wavelength longer than that of the first laser beam and shorter than that of the third laser beam (second wavelength) is emitted from a light source so as to form a relatively small beam spot on the record surface of the second optical disc D2. Incidentally, the first wavelength (λ1) and the third wavelength (λ3) satisfy the following relationship:

1.9<λ3/λ1<2.1

Figure 1:
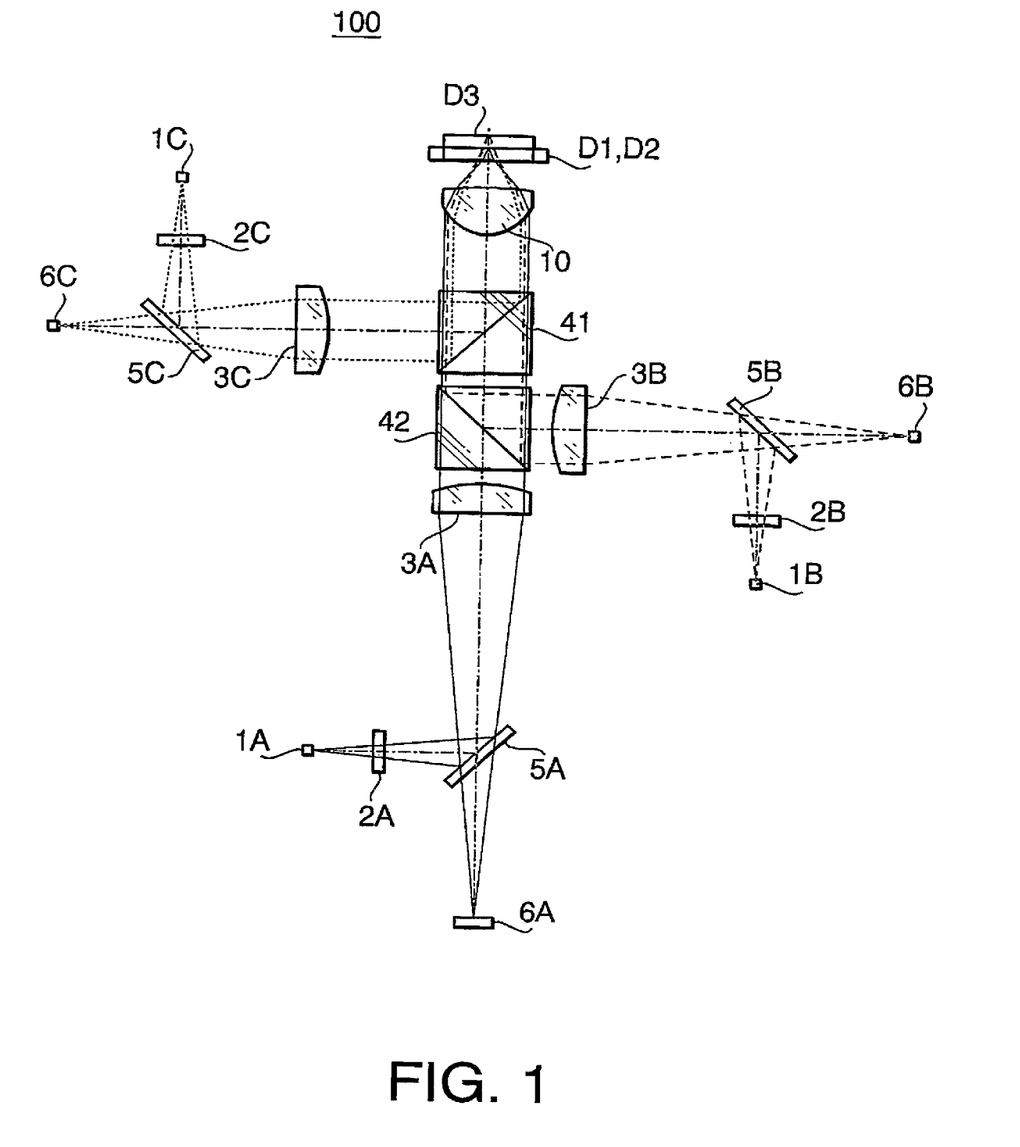
FIG. 1 is a schematic diagram showing the overall composition of an optical information recording/reproducing device which is equipped with an objective lens in accordance with an embodiment of the present invention.

FIG. 1 is a schematic diagram showing the overall composition of an optical information recording/reproducing device 100 which is equipped with the objective lens 10 according to the embodiment. The optical information recording/reproducing device 100 includes a light source 1A which emits the first laser beam, a light source 1B which emits the second laser beam, a light source 1C which emits the third laser beam, diffraction gratings 2A, 2B and 2C, coupling lenses 3A, 3B and 3C, beam splitters 41 and 42, half mirrors 5A, 5B and 5C, and photoreceptor units 6A, 6B and 6C. Since the optical information recording/reproducing device 100 has to support various NAs required for the information read/write on various optical discs, an aperture restricting element for specifying the beam diameter of the third laser beam may be placed on the optical path of the third laser beam between the light source 1C and the objective lens 10 (although not shown in FIG. 1).

As shown in FIG. 1, each laser beam (first laser beam, second laser beam, third laser beam) emitted by the corresponding light source (1A, 1B, 1C) enters the corresponding coupling lens (3A, 3B, 3C) after passing through the corresponding diffraction grating (2A, 2B, 2C) and being deflected by the corresponding half mirror (5A, 5B, 5C). Each coupling lens (3A, 3B, 3C) converts the incident beam into a collimated beam. Thus, each coupling lens 3A-3C functions as a collimator lens in this embodiment. Each laser beam passing through the coupling lens (3A, 3B, 3C) is guided to a common optical path by the beam splitters 41 and 42 and thereafter enters the objective lens 10. Each beam passing through the objective lens 10 is converged on a point in the vicinity of the record surface of the optical disc (D1, D2, D3) as the target of the information read/write. After being reflected by the record surface, each laser beam is detected by the corresponding photoreceptor unit (6A, 6B, 6C) via the half mirror (5A, 5B, 5C).

By letting each coupling lens 3A-3C converge each laser beam (to be incident upon the objective lens 10) into a collimated beam as above, aberration occurring during the tracking of the objective lens 10 (e.g. coma aberration) can be suppressed.

Incidentally, there are cases where each light beam emerging from each coupling lens 3A-3C is not necessarily a collimated beam in a strict sense, due to various factors such as individual differences and installation positions of the light sources 1A-1C, variations in the environment around the optical information recording/reproducing device 100, etc. However, the divergence angle of the light beam caused by the above factors is extremely small and the aberration occurring during the tracking shifts can also be regarded to be small, by which substantially no problem is caused in practical use.

Figure 2A:
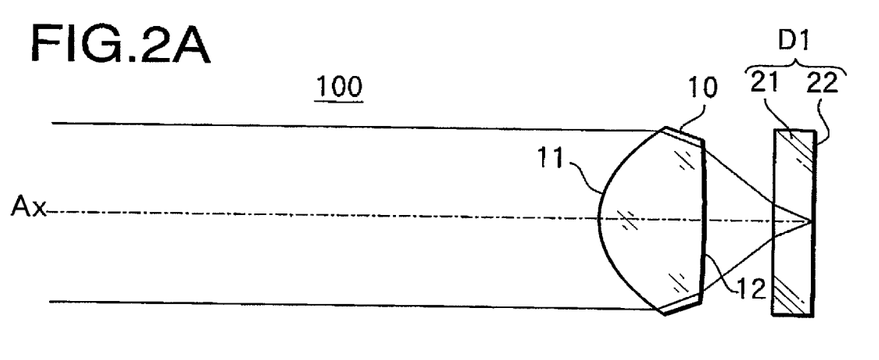
FIGS. 2A-2C are schematic diagrams showing the relationship among the objective lens, an optical disc and the optical path of a laser beam (first laser beam, second laser beam, third laser beam) in cases where first through third optical discs are used, respectively.
Figure 2B:
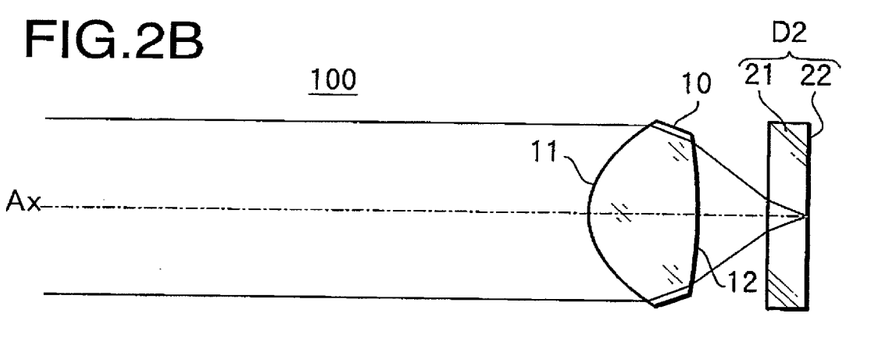
Figure 2C:
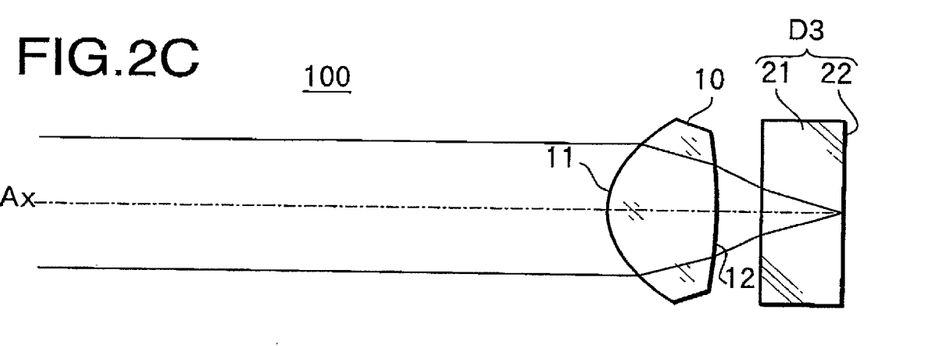

FIGS. 2A-2C are schematic diagrams showing the relationship among the objective lens 10, the optical disc (D1-D3) and the optical path of the laser beam (first laser beam, second laser beam, third laser beam) in cases where the first through third optical discs D1-D3 are used, respectively. In each of FIGS. 2A-2C, a reference axis AX of the optical system of the optical information recording/reproducing device 100 is indicated by a chain line. Incidentally, while the optical axis of the objective lens coincides with the reference axis AX of the optical system in the state shown in FIGS. 2A-2C, the optical axis of the objective lens can deviate from the reference axis AX due to the tracking operation.

The objective lens 10 has a first surface 11 (on the light source side) and a second surface 12. The objective lens 10 is a biconvex single lens made of plastic whose first and second surfaces 11 and 12 are both aspherical as shown in FIGS. 2A-2C. The configuration of each aspherical surface can be expressed by the following expression:

$$X(h) = \frac{Ch^2}{1 + \sqrt{1 - (K+1)C^2h^2}} + \sum_{i=2} A_{2i}h^{2i}$$

where X(h) denotes a SAG amount of a coordinate point on the aspherical surface whose height (distance) from the optical axis is h (SAG amount: distance measured from a tangential plane contacting the aspherical surface on the optical axis), "C" denotes the curvature (1/r) of the aspherical surface on the optical axis, "K" denotes a cone constant, and each "$A_{2i}$" (i: integer larger than 1) denotes an aspherical coefficient of the 2i-th order (the summation in the expression includes aspherical coefficients $A_4, A_6, A_8, A_{10}, A_{12}, \ldots$ of the fourth order, sixth order, eighth order, tenth order, twelfth order, and so forth).

Meanwhile, each optical disc D1-D3 has a protective layer 21 and a record surface 22. Incidentally, the record surface 22 is sandwiched between the protective layer 21 and a label layer (not shown) in actual optical discs D1-D3.

In cases where multiple laser beams of different wavelengths are used for various optical discs D1-D3 as in the optical information recording/reproducing device 100 of this embodiment, spherical aberration occurs due to variations in the refractive index of the objective lens 10, the thickness of the protective layer 21, etc. (which vary depending on which optical disc is used).

Therefore, in order to correct the spherical aberration (occurring in different ways when the three types of optical discs D1-D3 are used) and achieve the compatibility with the three types of optical discs D1-D3, the first surface 11 of the objective lens 10 of this embodiment is provided with a step structure having diffracting effects on the three types of light beams. The step structure formed on the first surface 11 includes a plurality of concentric refracting surfaces (annular zones) around the optical axis AX and a plurality of minute steps each of which is formed between adjacent refracting surfaces. Incidentally, by forming the step structure on the first surface 11 which does not face the optical disc, the steps are prevented from being destroyed by a lens cleaner, etc. and performance degradation of the optical information recording/reproducing device 100 can be avoided effectively.

Figure 3:
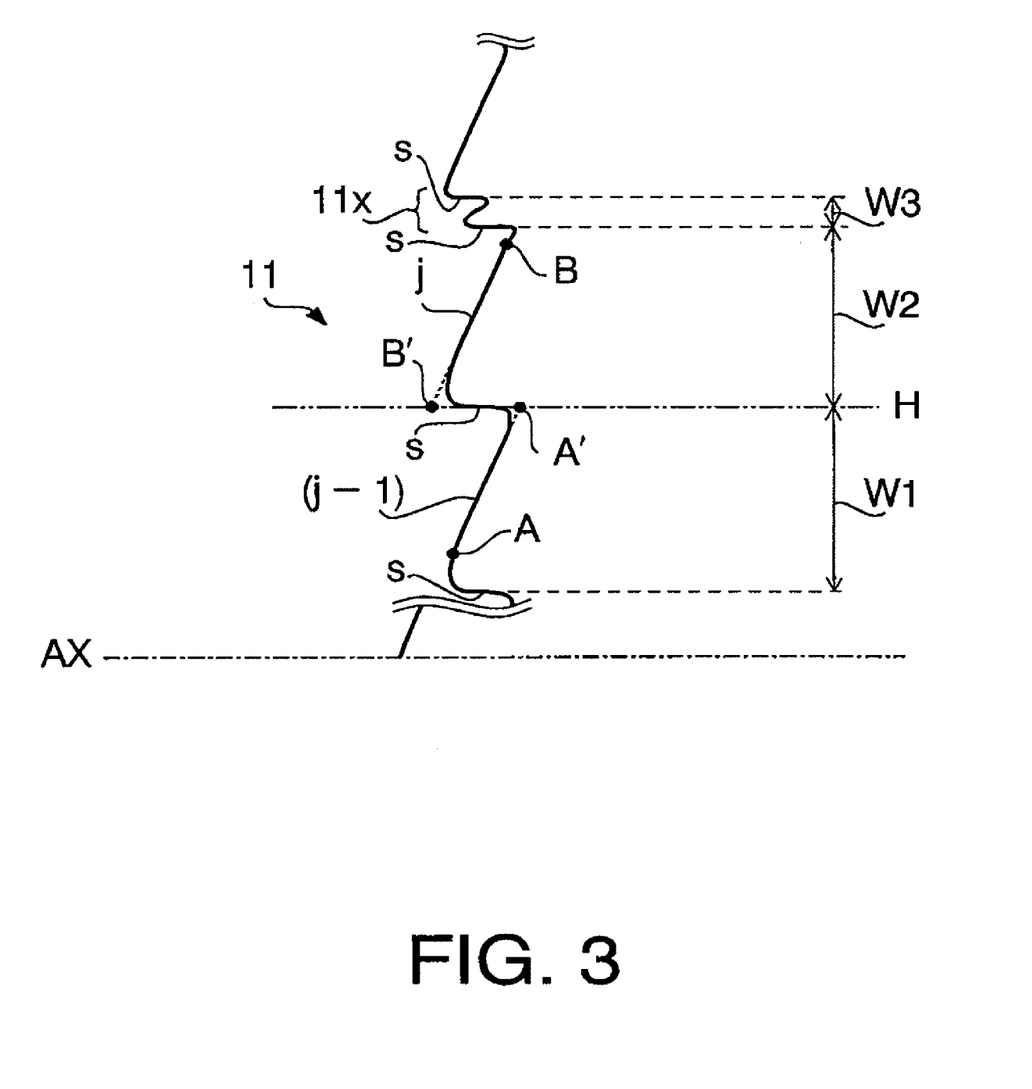
FIG. 3 is an enlarged cross-sectional view of a part of a first surface of an objective lens that is provisionally provided with a step structure with no compensation for "narrow annular zones".

To facilitate the understanding of the step structure according to the embodiment, FIG. 3 shows a step structure on which compensation for narrow annular zones has not been applied (i.e., the present invention has not been applied). That is, FIG. 3 is an enlarged cross-sectional view of a part of a first surface (11) of an objective lens (10) that is provisionally provided with a step structure with no compensation for "narrow annular zones". In FIG. 3, the reference character "j" represents the j-th refracting surface (from the optical axis AX) in the step structure, and the two-dot chain line H indicates the position of a step "s" formed between the j-th refracting surface and the (j-1)-th refracting surface, that is, the interface position between the j-th refracting surface and the (j-1)-th refracting surface. Here, a term "optical path length difference" is defined as the difference between a first optical path length (to the image surface) when a ray of light traveling along the two-dot chain line H is refracted by the first surface 11 at the position A' shown in FIG. 3 (where the two-dot chain line H intersects with a virtual extension plane A-A' of the (j-1)-th refracting surface) and a second optical path length (to the image surface) when the ray of light traveling along the two-dot chain line H is refracted by the first surface 11 at the position B' shown in FIG. 3 (where the two-dot chain line H intersects with a virtual extension plane B-B' of the j-th refracting surface). An "annular zone width" is defined as the distance (W1, W2, W3, . . . ) between two adjacent interface positions, that is, the distance between two adjacent steps "s" measured vertically in FIG. 3 (i.e. measured in a direction orthogonal to the optical axis AX).

Incidentally, in the actual step structure, peripheral parts (edges) of each refracting surface (parts in the vicinity of the interface positions) can be smoothed and rounded to some extent as shown in FIG. 3 in the formation process of the objective lens 10. However, such variations in the edge shapes cause substantially no problem in practical use.

The step structure in accordance with the embodiment has a diffracting effect capable of controlling and reducing the spherical aberration (caused by the difference in the wavelengths of the first through third laser beams being used) to approximately 0. The diffracting effect of the step structure of this embodiment, allowing each laser beam (passing through the objective lens 10) to form a desired beam spot suitable for the information read/write on the record surface 22 of the corresponding optical disc with excellently reduced spherical aberration, can be called a "three-wavelength-compatible effect".

The objective lens 10 having such a step structure is designed as described below. First, two types of optical path difference functions (first optical path difference function, second optical path difference function), differing in the ratio among diffraction orders of the first through third laser beams maximizing their diffraction efficiency, are figured out.

Here, the "differing in the ratio" is satisfied as long as there is a difference in at least one of the diffraction orders (maximizing the diffraction efficiency) of the employed laser beams. Therefore, in the case where three types of light beams are used, the "differing in the ratio" is satisfied when the ratio regarding the first optical path difference function is 3:2:2 and the ratio regarding the second optical path difference function is 3:2:1, for example. Incidentally, even when the combination of the diffraction orders differs between the two optical path difference functions, the diffracting effects provided by the two optical path difference functions are the same if the actual ratio among the three diffraction orders does not differ between the two optical path difference functions (e.g. when the ratio regarding the first optical path difference function is 2:1:1 and the ratio regarding the second optical path difference function is 4:2:2). Thus, in this embodiment, the difference in the ratio among the diffraction orders, instead of the difference in the combination of the diffraction orders, is employed as the condition for the setting of each optical path difference function.

Each optical path difference function expresses the function of the objective lens 10 as a diffracting lens, in terms of an optical path length difference at each height h from the optical axis. The optical path difference function φ(h) can be expressed by the following expression:

$$\phi(h) = m\lambda \sum_{i=1} P_{2i} h^{2i}$$

In the above optical path difference function φ(h), each "$P_{2i}$" (i: positive integer) denotes a coefficient of the 2i-th order (the summation in the expression includes coefficients $P_2$, $P_4$, $P_6$, . . . of the second order, fourth order, sixth order, and so forth), "m" denotes the diffraction order maximizing the diffraction efficiency of the laser beam being used, and "λ" denotes the design wavelength of the laser beam being used.

Figure 4A:
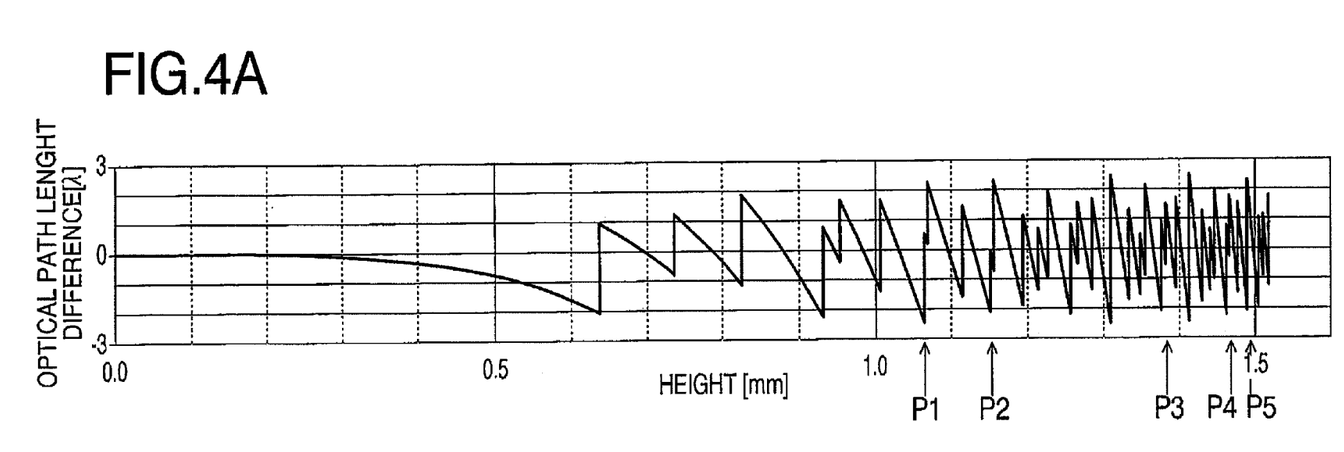
FIG. 4A is a graph showing an example of a reference optical path difference function (for specifying a step structure formed on a surface of an objective lens) before the compensation for the narrow annular zones.

After the first and second optical path difference functions have been figured out, a step structure specified by the summation of the two optical path difference functions is formed on the first surface 11 of the objective lens 10. FIG. 4A is a graph showing an example of the step structure specified by the summation of the first and second optical path difference functions, that is, an optical path difference function directly specifying the diffracting structure formed on the first surface 11 (hereinafter referred to as a "reference optical path difference function"). In the graph of FIG. 4A, the vertical axis represents the optical path length difference when the shortest one of the employed wavelengths (the first wavelength in this embodiment) is used, and the horizontal axis represents the height (incidence height) from the optical axis (ditto for the graph of FIG. 4B explained later). The reference optical path difference function shown in FIG. 4A draws the locus of the superposition (summation) of the first and second optical path difference functions.

Each step (formed in the step structure obtained based on the two different optical path difference functions as above) gives two types of optical path length differences (having different absolute values) to the first laser beam. The expression "having different absolute values" is used here to clarify that two optical path length differences having the same absolute value and different signs (defined to be positive/negative when the optical path length of light passing through the outer one of two adjacent annular zones is shorter/longer than that of light passing through the inner one, for example) are not regarded to be different from each other.

Incidentally, in order to provide the step structure with the "three-wavelength-compatible effect", one of the two types of optical path length differences is set at an odd multiple of the first wavelength, by which the spherical aberration occurring during the use of the third laser beam can be corrected excellently while maintaining "light utilization efficiency" of the first laser beam at a high level. Further, by setting the other optical path length difference at an even multiple of the first wavelength, the light utilization efficiency of both the first and third laser beams can be especially enhanced. With this configuration, the objective lens 10, receiving a collimated beam having a design wavelength corresponding to an optical disc (D1, D2, D3), is capable of forming a desired beam spot suitable for the information read/write on the record surface 22 of the optical disc (D1, D2, D3) while also reducing the spherical aberration.

The compatibility with the three types of laser beams is not provided by only one of the optical path difference functions since the above three-wavelength-compatible effect is achieved by interaction or cooperation between the first and second optical path difference functions.

Incidentally, in the step structure specified by the superposition (summation) of the two optical path difference functions, a "narrow annular zone $11x$" like the one shown in FIG. 3 can be formed due to two neighboring steps specified by the two optical path difference functions, respectively. The existence of such narrow annular zones $11x$ in the step structure can lead to performance degradation (e.g. decrease in the amount of transmitted light) when the optical surface having the steps is smoothed, rounded, etc. in the formation process of the objective lens 10. Therefore, it is necessary to properly remove each narrow annular zone $11x$ while also compensating for the optical path length differences given by the narrow annular zone $11x$. In this embodiment, the "narrow annular zone" is defined as an annular zone whose width is less than 10 times the wavelength of the first laser beam (i.e. the first wavelength which is the shortest). The threshold "10 times the wavelength of the first laser beam" is employed here since the diffraction efficiency drops sharply when the annular zone width gets narrower than the threshold. In the reference optical path difference function shown in FIG. 4A, the points P1-P5 correspond to the narrow annular zones $11x$.

Figure 4B:
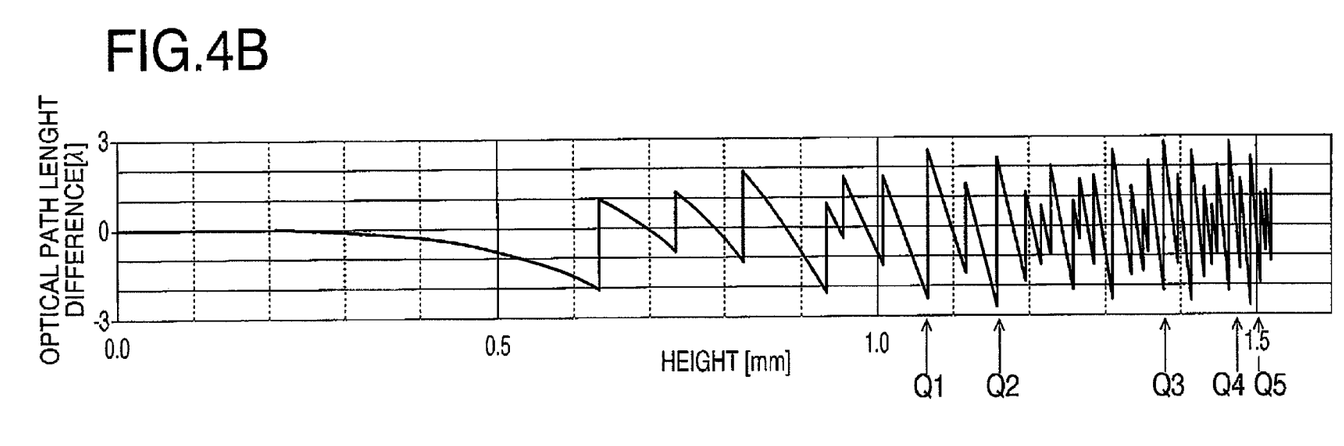
FIG. 4B is a graph showing an example of a reference optical path difference function (after the compensation for the narrow annular zones) specifying a step structure to be actually formed on the first surface of the objective lens of the embodiment.

In this embodiment, the narrow annular zones $11x$ are eliminated from the step structure actually formed on the first surface 11 of the objective lens 10, by eliminating the points P1-P5 (corresponding to the narrow annular zones) from the reference optical path difference function to be used for the formation of the step structure. Specifically, for each of the points P1-P5 (corresponding to the narrow annular zones) in the reference optical path difference function, corrective calculation is executed for substantially equalizing the incidence height positions of the two steps (formed between the narrow annular zone and two annular zones adjoining the narrow annular zone) by adjusting the positions for forming the steps. By the corrective calculation, one step that gives the sum or difference of/between the two optical path length differences given by the two steps can be formed. FIG. 4B shows an example of the reference optical path difference function after the corrective calculation (compensation for the narrow annular zones). As shown in FIG. 4B, a step, giving an optical path length difference equal to the sum or difference of/between the two optical path length differences obtained by the first and second optical path difference functions, has been formed at each of the positions Q1-Q5 corresponding to the points P1-P5 shown in FIG. 4A.

By the above corrective calculation, either or both of the positions of the two steps (formed between the narrow annular zone $11x$ and the two adjoining annular zones) are controlled so that the width of the narrow annular zone $11x$ becomes approximately 0. As a result of the control, a "special step" (which can not be specified only by the reference optical path difference function) appears at each position where a narrow annular zone existed. The special step gives an optical path length difference whose absolute value is obtained by the aforementioned sum or difference of/between the two optical path length differences.

Figure 5:
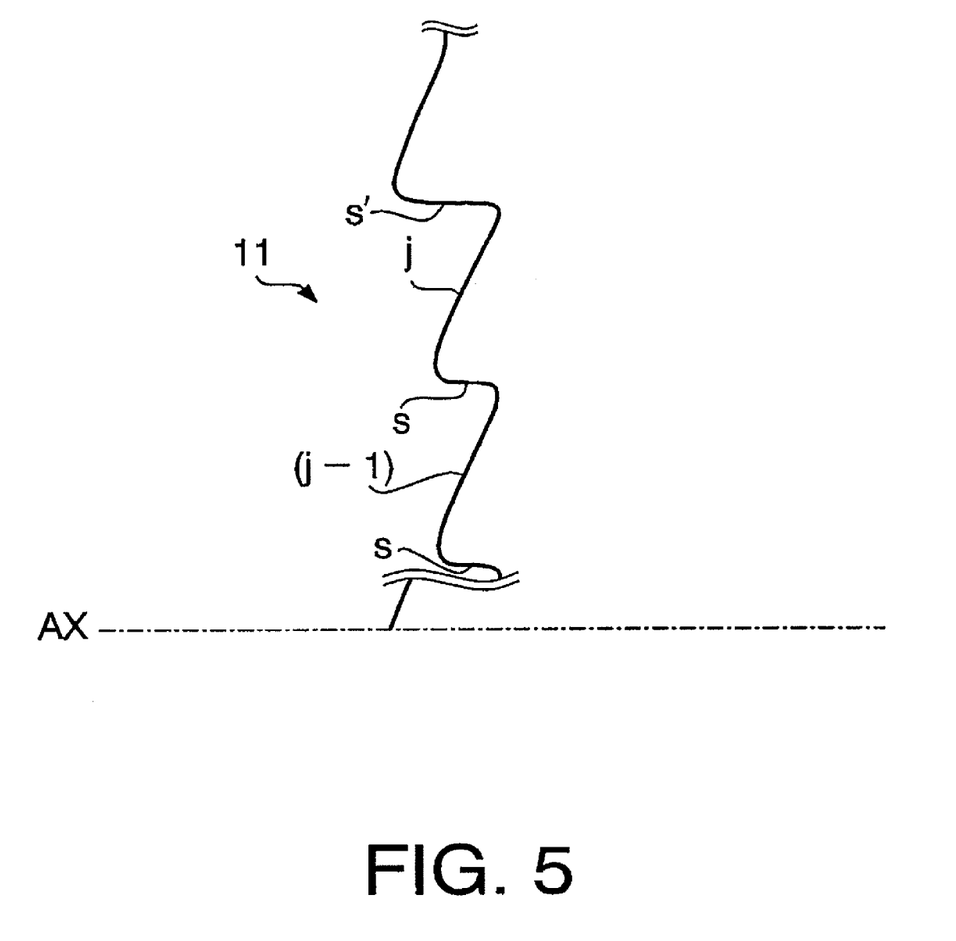
FIG. 5 is an enlarged cross-sectional view of a part of the first surface of the objective lens of the embodiment, having the step structure specified by the reference optical path difference function after the compensation for the narrow annular zones.

FIG. 5 is an enlarged cross-sectional view of a part of the first surface 11 of the objective lens 10 having the step structure to which the compensation for the narrow annular zones has been made. As shown in FIG. 5, the narrow annular zone $11x$ which existed in FIG. 3 has disappeared from the first surface 11 of the objective lens 10, and a special steps "s'''" (differing from other steps "s") has been formed at the position where the narrow annular zone $11x$ existed.

The absolute value of the optical path length difference given by the special step "s'''" takes on $|L2|-|L1|$ or $|L2|+|L1|$ depending on the relationship between the signs of L1 and L2 (L1: optical path length difference given by the step (first step) specified by the first optical path difference function, L2: optical path length difference given by the step (second step) specified by the second optical path difference function) assuming that $|L2|>|L1|$.

Incidentally, the first surface 11 of the objective lens 10 of this embodiment can be partitioned into two or more areas which are provided with different step structures, based on the difference in an effective beam diameter (necessary for securing the NA required for the information read/write). Specifically, the first surface 11 can be partitioned into an innermost area (including the optical axis) contributing to the convergence of the third laser beam, that is, contributing to the convergence of all the laser beams (hereinafter referred to as a "first area") and a second area outside the first area (, and a third area formed, outside the second area, depending on the situation).

The step structure of the second area has a "two-wavelength-compatible effect" for finely converging each of the first and second laser beams (whose effective beam diameters are generally larger than that of the third laser beam) on the record surface 22 of the corresponding optical disc (D1, D2). The step structure of the second area also has a wavelength variation compensation effect for the first and second laser beams as needed. When the step structure of the second area is provided with the wavelength variation compensation effect, the step structure is formed by figuring out two optical path difference functions and obtaining their superposition (summation) similarly to the first area.

The step structure of the second area has steps that do not contribute to the convergence of the third laser beam, that is, at least one of the optical path length differences of the steps in the second area differs from both of the optical path length differences in the first area.

Incidentally, the step structure explained above does not necessarily have to be formed on the entire first surface 11; it is also possible to form the step structure in the first area only or second area only.

The aforementioned third area (outside the second area) is employed when the effective beam diameter of the first laser beam on the first surface 11 of the objective lens 10 differs from the effective beam diameter of the second laser beam.

Assuming that the focal length of the objective lens 10 is f1 when the first optical disc D1 is used and f2 when the second optical disc D2 is used, when the following condition:

$$f1 \times NA1 > f2 \times NA2 \tag{1}$$

is satisfied, that is, when the effective beam diameter of the first laser beam (incident upon the first surface 11) on the incidence surface of the objective lens 10 is larger than that of the second laser beam on the incidence surface, a third area, having a step structure letting the first laser beam finely converge on the record surface of the first optical disc D1 with substantially no aberration, is formed on the first surface 11. Differently from the second area, this third area (which is formed in the case where the condition (1) is satisfied) does not contribute to the convergence of the second laser beam. In other words, the third area formed when the condition (1) is satisfied has an aperture restricting function for the second laser beam. Therefore, the step structure of the third area is designed so that the optical path length difference given to the first laser beam at the interface between two adjacent refracting surfaces differs from the optical path length difference given to the first laser beam in the second area. In the designing, the third area is blazed so as to maximize the diffraction efficiency of the first laser beam.

On the other hand, when the following condition:

$$f1 \times NA1 < f2 \times NA2 \qquad (2)$$

is satisfied, that is, when the effective beam diameter of the second laser beam (incident upon the first surface 11) on the incidence surface of the objective lens 10 is larger than that of the first laser beam on the incidence surface, a third area, having a step structure letting the second laser beam finely converge on the record surface of the second optical disc D2 with substantially no aberration, is formed on the first surface 11. Differently from the second area, this third area (which is formed in the case where the condition (2) is satisfied) does not contribute to the convergence of the first laser beam. In other words, the third area formed when the condition (2) is satisfied has the aperture restricting function for the first laser beam. Therefore, the step structure of the third area is designed so that the optical path length difference given to the second laser beam at the interface between two adjacent refracting surfaces differs from the optical path length difference given to the second laser beam in the second area. In the designing, the third area is blazed so as to maximize the diffraction efficiency of the second laser beam.

In the following, a concrete example of the optical information recording/reproducing device 100 employing the objective lens 10 according to the embodiment explained above will be described. The optical information recording/reproducing device 100 equipped with the objective lens 10 of the example is shown in FIG. 1 and FIGS. 2A-2C.

In this example, a first optical disc D1 having the highest data density and a protective layer thickness of 0.6 mm, a second optical disc D2 having a data density lower than that of the first optical disc D1 and a protective layer thickness of 0.6 mm, and a third optical disc D3 having the lowest data density and a protective layer thickness of 1.2 mm are assumed to be used.

EXAMPLE

In the objective lens 10 of this example, the step structure having the aforementioned three-wavelength-compatible effect is formed on the first surface 11. The following Table 1 shows concrete specifications of the objective lens 10 of this example.

TABLE 1

|  | 1st laser | 2nd laser | 3rd laser |
|---|---|---|---|
| design wavelength (nm) | 408 | 660 | 790 |
| focal length (mm) | 2.25 | 2.32 | 2.34 |
| NA | 0.65 | 0.60 | 0.51 |
| magnification | 0.000 | 0.000 | 0.000 |

In Table 1, the "design wavelength" means the wavelength of each laser beam which is regarded to be optimum for the information read/write on each optical disc D1-D3. As indicated by the "MAGNIFICATION" in Table 1, the laser beam is incident upon the objective lens 10 as a collimated beam in this example irrespective of which of the optical discs D1-D3 is used (i.e. irrespective of which of the first through third laser beams is used). The following Tables 2-4 show specific numerical configurations of the optical information recording/reproducing device 100 (equipped with the objective lens 10 having the specifications shown in Table 1) when each of the optical discs D1-D3 is used. Incidentally, numerical configurations of members (elements) placed between each light source and the objective lens 10 are omitted in Tables 2-4 for convenience of explanation.

TABLE 2

| surface No. | r | d | n(408 nm) | comments |
|---|---|---|---|---|
| 0 |  | ∞ |  | light source |
| 1 | 1.392 | 1.60 | 1.52424 | objective lens |
| 2 | −4.675 | 0.99 |  |  |
| 3 | ∞ | 0.60 | 1.62110 | optical disc |
| 4 | ∞ | — |  |  |

TABLE 3

| surface No. | r | d | n(660 nm) | comments |
|---|---|---|---|---|
| 0 |  | ∞ |  | light source |
| 1 | 1.392 | 1.60 | 1.50635 | objective lens |
| 2 | −4.675 | 1.05 |  |  |
| 3 | ∞ | 0.60 | 1.57961 | optical disc |
| 4 | ∞ | — |  |  |

TABLE 4

| surface No. | r | d | n(790 nm) | comments |
|---|---|---|---|---|
| 0 |  | ∞ |  | light source |
| 1 | 1.392 | 1.60 | 1.50313 | objective lens |
| 2 | −4.675 | 0.68 |  |  |
| 3 | ∞ | 1.20 | 1.57307 | optical disc |
| 4 | ∞ | — |  |  |

In Tables 2-4, the surface No. 0 represents the light source (1A-1C), the surface No. 1 represents the first surface 11 of the objective lens 10, the surface No. 2 represents the second surface 12 of the objective lens 10, the surface No. 3 represents the surface of the protective layer 21 of the optical disc (D1-D3), the surface No. 4 represents the record surface 22 of the optical disc (D1-D3), "r" denotes the curvature radius [mm] of each optical surface, "d" denotes the distance [mm] from each optical surface to the next optical surface during the information read/write, "n (X nm)" denotes the refractive index of a medium between each optical surface and the next optical surface for a wavelength of X nm.

The first and second surfaces 11 and 12 of the objective lens 10 (surfaces Nos. 1 and 2) are aspherical surfaces. The following Table 5 shows the cone constant and aspherical coefficients specifying the shape of each aspherical surface (11, 12). Incidentally, the notation "E" in Table 5 (and Table 6) means the power of 10 with an exponent specified by the number to the right of E (e.g. "E-04" means "×10$^{-4}$").

TABLE 5

|  | K | A4 | A6 | A8 | A10 | A12 | A14 |
|---|---|---|---|---|---|---|---|
| 1 | −0.6500 | 1.27937E−04 | −1.76290E−03 | 1.70447E−03 | −2.49261E−03 | 1.52369E−03 | −3.80496E−04 |
| 2 | 0.0000 | 7.75911E−02 | −6.96224E−02 | 6.85768E−02 | −4.63783E−02 | 1.59165E−02 | −2.19585E−03 |

The following Tables 6 and 7 show the coefficients $P_{2i}$ of the first and second optical path difference (OPD) functions for specifying the step structure to be formed on the first surface 11 of the objective lens 10 of this example and the diffraction orders m maximizing the diffraction efficiency of each laser beam, respectively. As shown in Table 7, the diffraction orders maximizing the diffraction efficiency of the first laser beam differs from those maximizing the diffraction efficiency of the second and third laser beams.

TABLE 6

|  | P2 | P4 | P6 | P8 | P10 | P12 |
|---|---|---|---|---|---|---|
| 1 (1$^{st}$ OPD function) | 0.00000E+00 | −1.62222E+00 | −6.93841E−02 | −1.55072E−01 | 0.00000E+00 | 0.00000E+00 |
| 1 (2$^{nd}$ OPD function) | 0.00000E+00 | −2.89986E+00 | −4.31520E−01 | −4.15845E−02 | −2.51915E−02 | 0.00000E+00 |

TABLE 7

| diffraction order | 1$^{st}$ laser | 2$^{nd}$ laser | 3$^{rd}$ laser |
|---|---|---|---|
| 1$^{st}$ OPD function | 2 (=L1) | 1 | 1 |
| 2$^{nd}$ OPD function | 3 (=L2) | 2 | 2 |

The following Table 8 shows specific numerical configurations of the step structure actually formed on the first surface 11 of the objective lens 10 of this example. Table 8 indicates the range (start position, end position) of each annular zone (refracting surface) formed on the first surface 11, the width of each annular zone, the optical path length difference (OPLD) given to the first laser beam passing through each annular zone, and a step configuration corresponding to each optical path length difference. The range (start position, end position) of each annular zone is expressed in terms of the heights (hmin–hmax) from the optical axis AX. In regard to the reference optical path difference function specifying the step structure, the reference optical path difference function before the corrective calculation for compensating for the narrow annular zones is shown in FIG. 4A and that after the corrective calculation is shown in FIG. 4B.

TABLE 8

| No. | start position [mm] | end position [mm] | annular zone width [mm] | OPLD [λ] | step configuration |
|---|---|---|---|---|---|
| 0 | 0.000 | 0.635 | 0.635 | — | — |
| 1 | 0.635 | 0.736 | 0.101 | −3 | |L2| |
| 2 | 0.736 | 0.826 | 0.090 | −2 | |L1| |
| 3 | 0.826 | 0.931 | 0.105 | −3 | |L2| |
| 4 | 0.931 | 0.954 | 0.022 | −3 | |L2| |
| 5 | 0.954 | 1.007 | 0.053 | −2 | |L1| |
| 6 | 1.007 | 1.066 | 0.059 | −3 | |L2| |
| 7 | 1.066 | 1.116 | 0.049 | −5 | |L2| + |L1| |
| 8 | 1.116 | 1.158 | 0.042 | −3 | |L2| |
| 9 | 1.158 | 1.195 | 0.037 | −5 | |L2| + |L1| |
| 10 | 1.195 | 1.215 | 0.020 | −3 | |L2| |
| 11 | 1.215 | 1.228 | 0.013 | −2 | |L1| |
| 12 | 1.228 | 1.258 | 0.030 | −3 | |L2| |
| 13 | 1.258 | 1.267 | 0.009 | −3 | |L2| |
| 14 | 1.267 | 1.286 | 0.019 | −2 | |L1| |
| 15 | 1.286 | 1.311 | 0.025 | −3 | |L2| |
| 16 | 1.311 | 1.334 | 0.023 | −5 | |L2| + |L1| |
| 17 | 1.334 | 1.349 | 0.015 | −3 | |L2| |
| 18 | 1.349 | 1.356 | 0.007 | −2 | |L1| |
| 19 | 1.356 | 1.377 | 0.020 | −3 | |L2| |
| 20 | 1.377 | 1.396 | 0.019 | −5 | |L2| + |L1| |
| 21 | 1.396 | 1.414 | 0.018 | −3 | |L2| |
| 22 | 1.414 | 1.431 | 0.017 | −5 | |L2| + |L1| |
| 23 | 1.431 | 1.441 | 0.010 | −3 | |L2| |
| 24 | 1.441 | 1.447 | 0.006 | −2 | |L1| |
| 25 | 1.447 | 1.463 | 0.015 | −3 | |L2| |
| 26 | 1.463 | 1.477 | 0.015 | −5 | |L2| + |L1| |
| 27 | 1.477 | 1.492 | 0.014 | −3 | |L2| |
| 28 | 1.492 | 1.505 | 0.014 | −5 | |L2| + |L1| |
| 29 | 1.505 | 1.511 | 0.006 | −3 | |L2| |
| 30 | 1.511 | 1.518 | 0.007 | −2 | |L1| |
| 31 | 1.518 | 1.520 | 0.002 | −3 | |L2| |

As shown in Table 8, the optical path length difference given to the first laser beam by each step between adjacent annular zones is mainly −3λ or −2λ (λ: wavelength). Specifically, the step structure in this example includes the first steps (each giving an optical path length difference L1 having an absolute value |L1| of 2λ) and the second steps (each giving an optical path length difference L2 having an absolute value |L2| of 3λ) which are arranged a periodically. Incidentally, each of the steps Nos. 7, 9, 16, 20, 22, 26 and 28 gives an optical path length difference of −5λ. These steps are the special steps whose absolute values (of the optical path length difference) are obtained by |L2|+|L1|(=5λ). Comparing FIGS. 4A and 4B, the narrow annular zones seen in FIG. 4A have effectively been removed in FIG. 4B by the formation of the special steps. Incidentally, since parts of the graph of FIG. 4A corresponding to the steps Nos. 16 and 22 in Table 8 also have extremely narrow annular zones (although hardly recognizable to the naked eye), the steps Nos. 16 and 22 are also formed as the special steps as above.

As described above, in the optical information recording/reproducing device in accordance with this embodiment (which executes information reading or writing on three types of optical discs (D1-D3) having different data densities by selectively using first through third light beams having first through third wavelengths λ1-λ3(λ1<λ2<λ3) respectively), at least one side of an optical element (e.g. objective lens 10) is provided with a step structure including a plurality of concentric refracting surfaces and steps between adjacent refracting surfaces. The step structure includes an area contributing to the convergence of a prescribed light beam in order to secure an NA (Numerical Aperture) required for the information read/write on a prescribed optical disc. The area is provided with two types of steps giving different optical path length differences specified by different optical path difference functions. When there exists an annular zone (between a pair of adjacent steps) having a width narrower than 10 times the first wavelength, at least one of such close pairs of adjacent steps is formed into a special step by reducing the narrow annular zone width to approximately 0 by controlling at least one of the steps forming the pair. With the configuration, an optical element for an optical information recording/reproducing device, having the compatibility with multiple types of optical discs of different standards and achieving high performance (high light utilization efficiency, reduced aberration, desired beam spot on each optical disc, etc.) while being manufactured with ease, can be realized.

While a description has been given above of a preferred embodiment in accordance with the present invention, the present invention is not to be restricted by the particular illustrative embodiment and a variety of modifications, design changes, etc. are possible without departing from the scope and spirit of the present invention described in the appended claims.

For example, the objective lens described in the above embodiment (including the specific example) is just an illustration of an objective lens designed by the design method in accordance with the present invention, and thus the objective lens in accordance with the present invention is not to be restricted to the specific numerical configurations described in the embodiment.

The objective optical system of the optical information recording/reproducing device in accordance with the present invention may also include two or more optical elements (e.g. lenses). The optical element in accordance with the present invention may be provided with the step structure on both sides while the objective lens 10 in the above embodiment has the step structure on one side (first surface 11) only.

The value of spherical aberration achieved by the adjustment by the three-wavelength-compatible effect of the step structure is not restricted to 0; the target value of the spherical aberration may be set arbitrarily by the designer of the optical system. Also regarding the wavelength variation compensation effect, the step structure does not necessarily have to be provided with the effect of canceling (compensating for) the change in the spherical aberration caused by the wavelength variation; the degree of the change in the spherical aberration caused by the wavelength variation may be set arbitrarily by the designer.

This application claims priority of Japanese Patent Application No. P2006-145220, filed on May 25, 2006. The entire subject matter of the applications is incorporated herein by reference.

What is claimed is:

1. An optical element for an optical information recording/reproducing device which executes information reading and/or writing on multiple types of optical discs having different data densities by selectively using first through third light beams having first through third wavelengths $\lambda 1$-$\lambda 3$ ($\lambda 1<\lambda 2<\lambda 3$) respectively, wherein:

at least one side of the optical element is provided with a step structure including a plurality of concentric refracting surfaces and a plurality of steps formed between adjacent ones of the plurality of concentric refracting surfaces;

the plurality of steps include first steps each giving a first optical path length difference specified by a first optical path difference function, second steps each giving a second optical path length difference specified by a second optical path difference function different from the first optical path difference function, and special steps each giving an optical path length difference obtained by one of a sum of the first and second optical path length differences and a difference between the first and second optical path length differences; and each of annular zone widths between adjacent ones of the plurality of steps is set at 10 times the first wavelength or more.

2. The optical element according to claim 1, wherein:

the special step gives the first light beam an optical path length difference having an absolute value substantially equal to $|L2|-|L1|$ when a first optical path length difference L1 specified by the first optical path difference function for the first light beam and a second optical path length difference L2 specified by the second optical path difference function for the first light beam (assuming that $|L1|<|L2|$) satisfy $L1 \times L2 < 0$; and the special step gives the first light beam an optical path length difference having an absolute value substantially equal to $|L2|+|L1|$ when the first and second optical path length differences L1 and L2 satisfy $L1 \times L2 > 0$.

3. The optical element according to claim 1, wherein the optical element is an objective lens used for the optical information recording/reproducing device.

4. The optical element according to claim 1, wherein:

a protective layer thickness t1 of a first optical disc on which the information read/write is executed using the first light beam, a protective layer thickness t2 of a second optical disc on which the information read/write is executed using the second light beam, and a protective layer thickness t3 of a third optical disc on which the information read/write is executed using the third light beam satisfy $t1 \leqq t2 < t3$, and a numerical aperture NA1 of the optical element required for the information read/write on the first optical disc, a numerical aperture NA2 of the optical element required for the information read/write on the second optical disc, and a numerical aperture NA3 of the optical element required for the information read/write on the third optical disc satisfy NA1>NA3 and NA2>NA3, and the step structure includes:

a first area which is formed to include an optical axis of the optical element to converge the third light beam on a record surface of the third optical disc; and a second area which is formed outside the first area to converge the first and second light beams on record surfaces of the first and second optical discs, respectively, without contributing to the convergence of the third light beam.

5. The optical element according to claim 4, wherein:

a focal length f1 in the information read/write on the first optical disc, a focal length f2 in the information read/write on the second optical disc and the numerical apertures NA1 and NA2 satisfy $f1 \times NA1 > f2 \times NA2$, and the step structure further includes a third area which is formed outside the second area to exclusively converge the first light beam on the record surface of the first optical disc without contributing to the convergence of the second light beam.

6. The optical element according to claim 4, wherein:

a focal length f1 in the information read/write on the first optical disc, a focal length f2 in the information read/write on the second optical disc and the numerical apertures NA1 and NA2 satisfy $f1 \times NA1 < f2 \times NA2$, and the step structure further includes a third area which is formed outside the second area to exclusively converge the second light beam on the record surface of the second optical disc without contributing to the convergence of the first light beam.

7. An optical information recording/reproducing device which executes information reading and/or writing on multiple types of optical discs having different data densities by selectively using first through third light beams having first through third wavelengths $\lambda1$-$\lambda3$ ($\lambda1<\lambda2<\lambda3$) respectively, wherein:

a protective layer thickness t1 of a first optical disc on which the information read/write is executed using the first light beam, a protective layer thickness t2 of a second optical disc on which the information read/write is executed using the second light beam, and a protective layer thickness t3 of a third optical disc on which the information read/write is executed using the third light beam satisfy $t1 \leq t2 < t3$;

a numerical aperture NA1 of the optical element required for the information read/write on the first optical disc, a numerical aperture NA2 of the optical element required for the information read/write on the second optical disc, and a numerical aperture NA3 of the optical element required for the information read/write on the third optical disc satisfy NA1>NA3 and NA2>NA3;

at least one side of an optical element of an objective optical system of the optical information recording/reproducing device is provided with a step structure including a plurality of concentric refracting surfaces and a plurality of steps formed between adjacent ones of the plurality of concentric refracting surfaces;

the steps include first steps each giving a first optical path length difference specified by a first optical path difference function, second steps each giving a second optical path length difference specified by a second optical path difference function different from the first optical path difference function, and special steps each giving an optical path length difference obtained by one of a sum of the first and second optical path length differences and a difference between the first and second optical path length differences; and each of annular zone widths between adjacent ones of the plurality of steps is set at 10 times the first wavelength or more.

8. The optical information recording/reproducing device according to claim 7, wherein the step structure includes:

a first area which is formed to include an optical axis of the optical element to converge the third light beam on a record surface of the third optical disc; and a second area which is formed outside the first area to converge the first and second light beams on record surfaces of the first and second optical discs, respectively, without contributing to convergence of the third light beam.

9. The optical information recording/reproducing device according to claim 8, wherein:

a focal length f1 in the information read/write on the first optical disc and a focal length f2 in the information read/write on the second optical disc and the numerical apertures NA1 and NA2 satisfy f1×NA1>f2×NA2; and the step structure further includes a third area which is formed outside the second area to exclusively converge the first light beam on the record surface of the first optical disc without contributing to the convergence of the second light beam.

10. The optical information recording/reproducing device according to claim 8, wherein:

a focal length f1 in the information read/write on the first optical disc and a focal length f2 in the information read/write on the second optical disc and the numerical apertures NA1 and NA2 satisfy f1×NA1<f2×NA2; and the step structure further includes a third area which is formed outside the second area to exclusively converge the second light beam on the record surface of the second optical disc without contributing to the convergence of the first light beam.

11. The optical information recording/reproducing device according to claim 7, wherein all of the first through third light beams incident upon the optical element having the step structure are substantially collimated beams.

12. A design method of an optical element for an optical information recording/reproducing device which executes information reading and/or writing on multiple types of optical discs having different data densities by selectively using first through third light beams having first through third wavelengths $\lambda1$-$\lambda3$ ($\lambda1<\lambda2<\lambda3$) respectively, at least one side of the optical element being provided with a step structure including a plurality of concentric refracting surfaces and a plurality of steps formed between adjacent ones of the plurality of concentric refracting surfaces, the method comprising the steps of:

defining the step structure by use of at least two types of optical path difference functions; and setting at least one special step by reducing position difference between at least one pair of adjacent steps, which are included in a plurality of steps figured out based on the at least two types of optical path difference functions and whose position difference is less than 10 times the first wavelength, to substantially 0 by controlling at least one of the positions of the adjacent steps forming the pair.

13. The design method according to claim 12, wherein the design process of the step structure is applied to at least one pair of adjacent steps that give optical path length differences having different signs.

* * * * *